(12) United States Patent
Trigo

(10) Patent No.: US 9,434,226 B1
(45) Date of Patent: Sep. 6, 2016

(54) VEHICLE CONTROL SYSTEM

(71) Applicant: Kevin A. Trigo, Wilbraham, MA (US)

(72) Inventor: Kevin A. Trigo, Wilbraham, MA (US)

( * ) Notice: Subject to any disclaimer, the term of this patent is extended or adjusted under 35 U.S.C. 154(b) by 0 days.

(21) Appl. No.: 14/756,986

(22) Filed: Nov. 5, 2015

(51) Int. Cl.
*B60D 1/04* (2006.01)
*B60D 99/00* (2009.01)

(52) U.S. Cl.
CPC ...................................... *B60D 7/00* (2013.01)

(58) Field of Classification Search
CPC ............ B60D 7/00; B60D 1/00; B60D 1/01; B60D 1/24; B60D 1/58; B60R 25/00
See application file for complete search history.

(56) References Cited

U.S. PATENT DOCUMENTS

| | | | | |
|---|---|---|---|---|
| 5,839,759 A * | 11/1998 | Trigo | ...................... | B60R 25/00 180/287 |
| 6,000,709 A * | 12/1999 | Gentner | .................... | B60D 1/40 180/178 |
| 7,168,906 B2 * | 1/2007 | Weatherford | ............ | B60D 1/00 280/762 |
| 7,452,015 B1 * | 11/2008 | Stock, Jr. | ................ | B60R 25/00 180/271 |
| 7,540,545 B1 * | 6/2009 | Fetch | ........................ | B60D 1/00 294/106 |
| 7,591,477 B2 * | 9/2009 | Pohler | ...................... | B60D 1/00 280/502 |
| 2011/0272957 A1 * | 11/2011 | Fetch | ........................ | B60D 1/24 294/106 |

* cited by examiner

*Primary Examiner* — John Walters
*Assistant Examiner* — Brian Swenson
(74) *Attorney, Agent, or Firm* — Robert J Doherty

(57) ABSTRACT

A capture and control device adapted for mounting to the front end of a law enforcement vehicle so as to restrain a suspect vehicle from fleeing and including at least one hook adapted to fit into undercarriage areas of the suspect vehicle.

4 Claims, 5 Drawing Sheets

VEHICLE CONTROL SYSTEM

This application claims the benefit of U.S. Provisional Patent Application No. 62/123,096 filed Nov. 6, 2014 and U.S. Provisional Patent Application No. 62/123,485 filed Nov. 18, 2014.

BACKGROUND OF THE INVENTION

This invention is a modification and improvement over applicant's previous U.S. Pat. No. 5,839,759 issued Nov. 24, 1998, the specification of which is hereby incorporated herein by specific reference thereto. The capture device of that prior invention as well as the present invention involves the placing of hook portions mounted on the front of a capture vehicle, e.g., a police cruiser or other law enforcement vehicle, beneath rear portions of a vehicle that is fleeing or is likely to flee from the capture vehicle.

The device of applicant's prior patent, namely, U.S. Pat. No. 5,839,759 issued Nov. 24, 1998, generally involves engaging hook portions upwardly to the capture position when activated by contact between a front portion of the capture vehicle and the rear of the suspect vehicle. However, there are situations when actual contact and capture of the suspect vehicle are not warranted; and thus, the present invention mounts proximity sensors on the device to achieve greater flexibility by the operator, e.g., police officer, of the capture vehicle.

Thus with the use of proximity sensors on the hook tips and on the uprights, the capture device could come within a specified distance from hooking the suspect vehicle without physically touching the suspect vehicle with the hook tips positioned beneath portions of the rear end of the suspect vehicle as shown in FIG. 1. If the suspect vehicle violates a specified threshold away from the unit in an attempt to flee, the capture device of the present invention could react by automatically upwardly moving the hook tips to the capture position and thus capture the suspect vehicle. With the use of a key chain fob, the capture device of the instant invention could be operated remotely from outside of the police vehicle such as when the officer leaves his/her vehicle to question the suspect.

In addition, it may be advisable to equip the control vehicle with a brakes control mechanism that locks the brakes (either front or rear or both) so that the control vehicle will not roll should the suspect vehicle attempt to escape. Such brake control devices are commercially available, e.g., the Hurst Roll Control Kits at www.jegs.com.

Suitable proximity sensors include those presently utilized as backup warning sensors on many late model vehicles, e.g., the Wagan EL2436 Wireless Rear Backup Safety Sensor.

In addition, the device of the present invention sets forth an improved and more flexible hook and hook activation mechanism that is better suited to police situations when it is not certain that the suspect vehicle should be positively restrained and provides for hook actuation motor means that is unlikely to damage undercarriage portions such as the gas tank of the suspect vehicle.

It will thus be apparent that the features of the present invention will contribute to a desirable objective of reducing active law enforcement vehicle pursuits by intervention that safely controls suspect vehicles before an active pursuit begins.

These and other objects of the present invention are accomplished by the provision of a capture device mounted at the front end of said control vehicle for positively engaging portions of an undercarriage of a suspect vehicle positioned in front of and in close adjacent contact to said control vehicle, said capture device comprising means for attachment to the front end of the control vehicle and at least one movable arm having an inner end and a forward end and having an upwardly extending terminal hook portion at said forward end, said arm in turn mounted on said front end and movable from a storage position to an extended first operable position wherein said arm extends outwardly and forwardly from said control vehicle front end and beneath the undercarriage of the suspect vehicle and subsequently to a second operable position elevated from said first operable position wherein said hook portion is capable of entrapping portions of the undercarriage of the suspect vehicle, said hook portion having inner and outer surfaces and being open at said inner surface with said open inner surface oriented towards said control vehicle front end in the storage position and upwardly in said operable positions, and actuation means for moving said arm from said storage position to said first operable position and subsequently to said second operable position, wherein said at least one movable arm upon an assembly in turn attached to a frame in turn attached to the front end of the vehicle, said arm pivotally attached to said frame and said actuation means via linkage, and in addition first and second elongated stabilizing members operationally connected to said linkage and to said assembly, said first stabilizing member biased to an always extended first position and said second stabilizing member always biased to a retracted or compressed first position and both said stabilizing members free to move into a second position opposite to their respective first positions.

Other objects, features and advantages of the invention shall become apparent as the description thereof proceeds when considered in connection with the accompanying illustrative drawings.

DESCRIPTION OF THE DRAWING

In the drawings which illustrate the best mode presently contemplated for carrying out the present invention.

DESCRIPTION OF THE INVENTION

Figure 1:
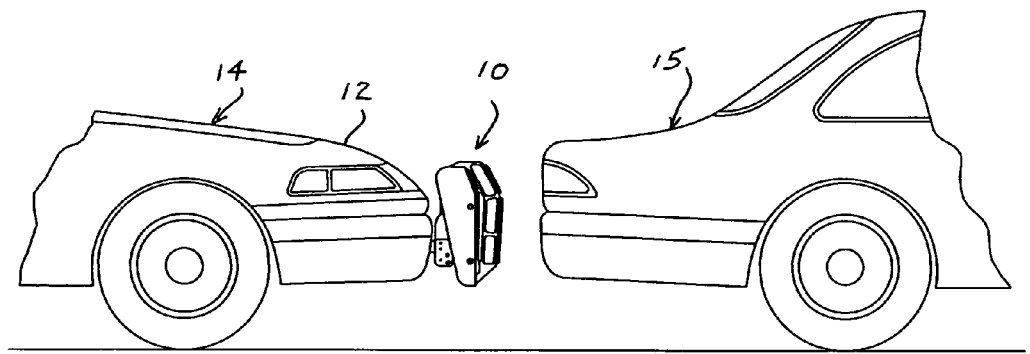
FIG. 1 shows a schematic side view of a suspect vehicle and a police vehicle in close proximity thereto with the capture device in the storage position.
Figure 2:
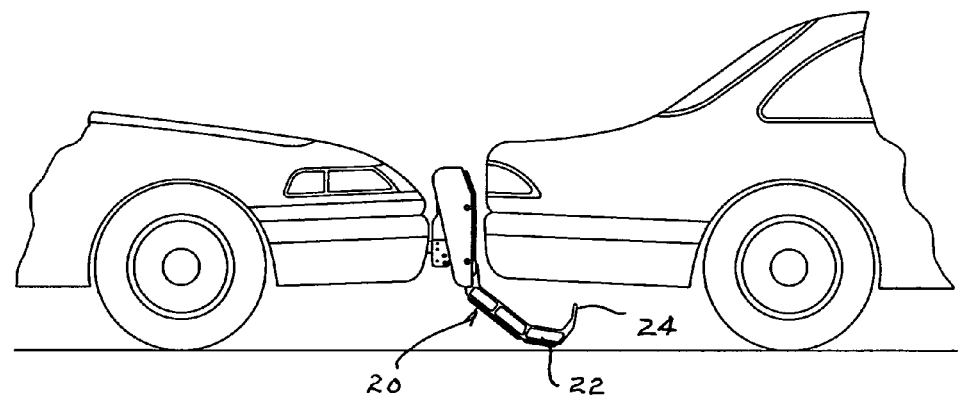
FIG. 2 shows a schematic side view of a suspect vehicle and a police vehicle in close proximity thereto with the capture device in the use position with the hooks down.
Figure 3:
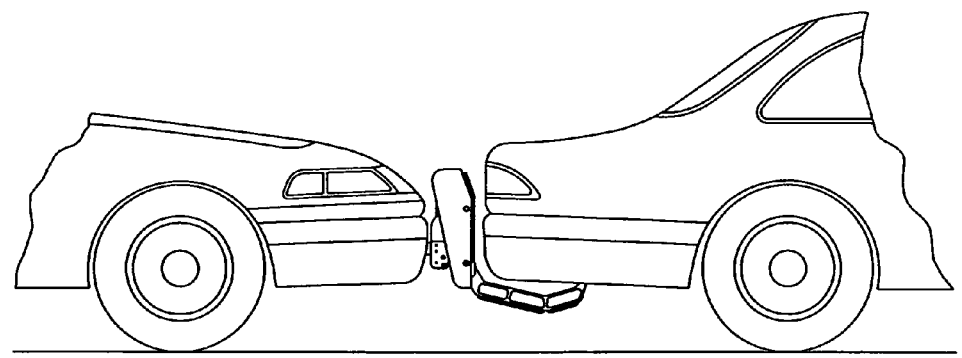
FIG. 3 shows a schematic side view of a suspect vehicle and a police vehicle in close proximity thereto with the capture device in the use position with the hooks up and in contact with undercarriage portions of the suspect vehicle or in close proximity thereto.
Figure 4:
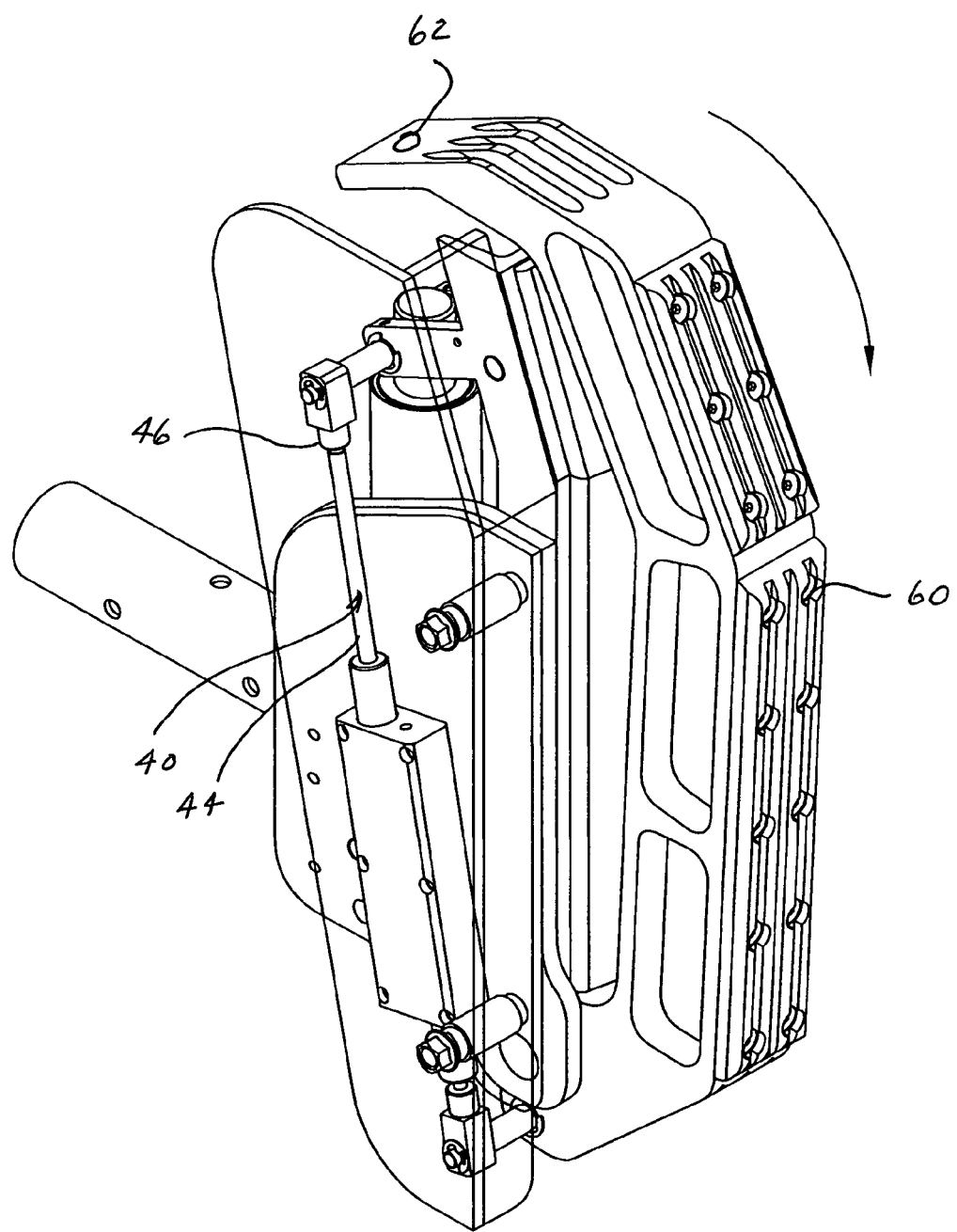
FIG. 4 is a left side perspective view on an enlarged scale of one of the hook assemblies of the capture device.
Figure 5:
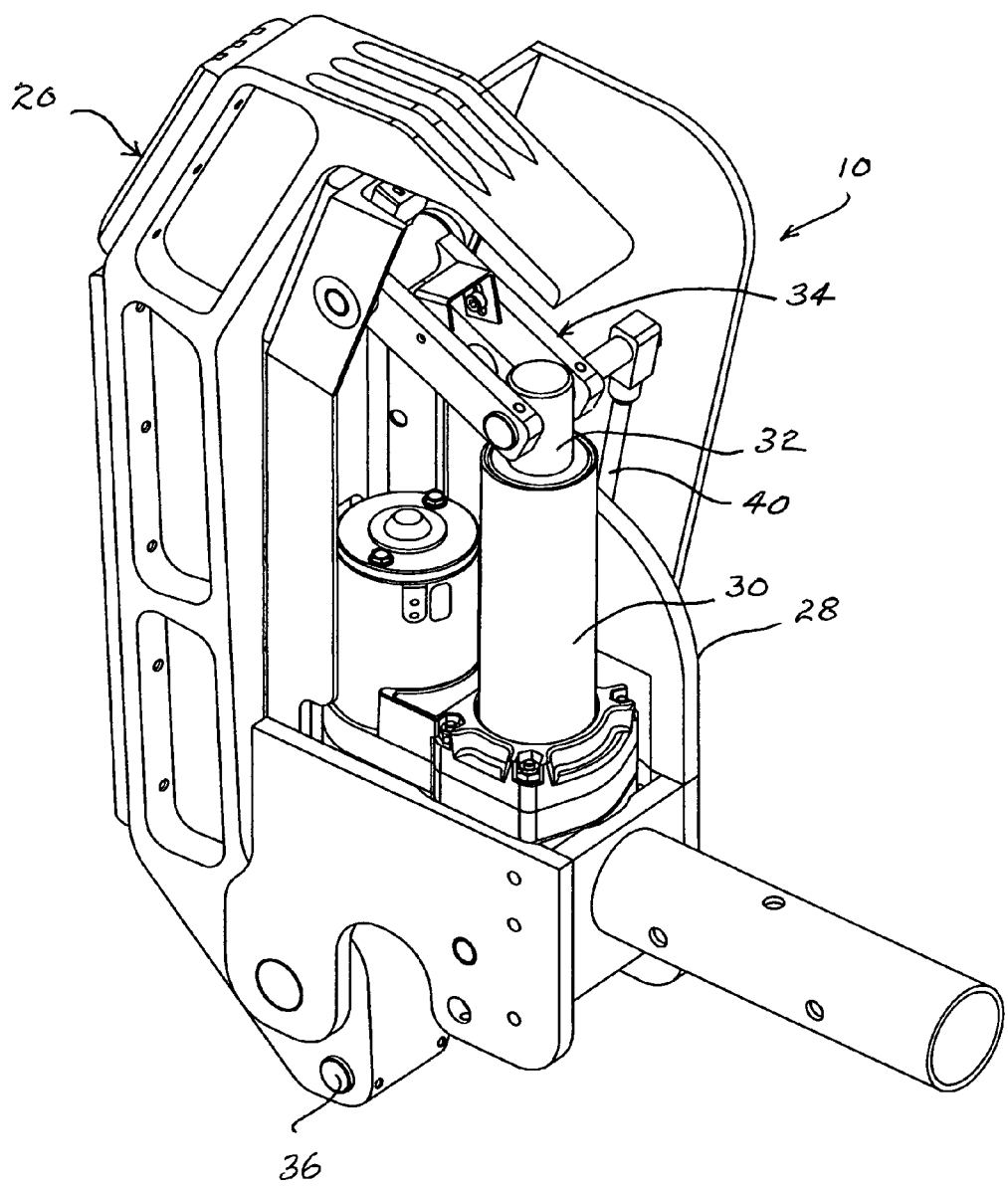
FIG. 5 is a right side perspective view of the capture device.
Figure 6:
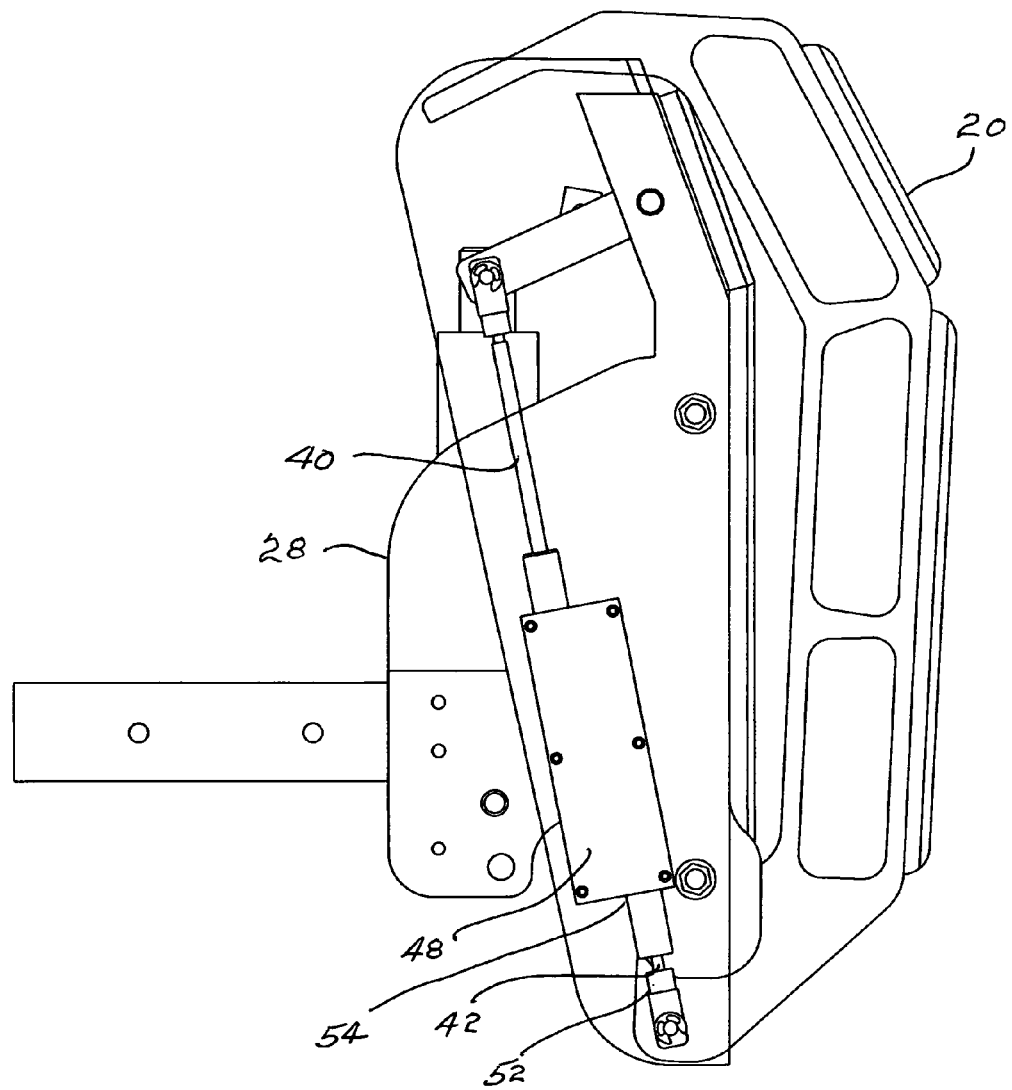
FIG. 6 is a right side section of FIG. 4 with the motor removed.
Figure 7:
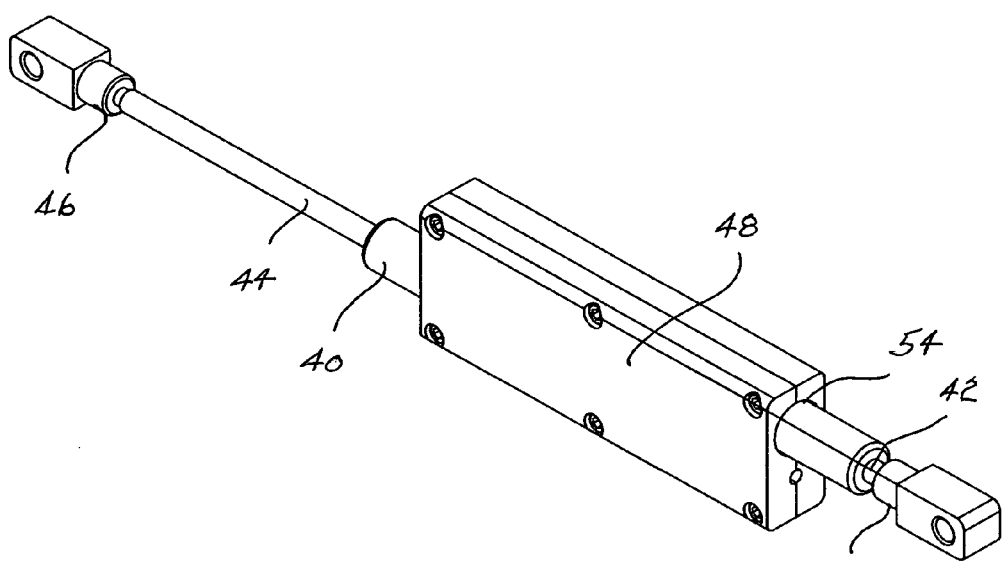
FIG. 7 is an enlarged perspective view of a shock absorber and block assembly removed from the capture device.

Turning now to the drawings and particularly FIGS. 1-3, the capture device 10 of the present invention is shown attached to the front end 12 of a standard vehicle 14 such as a police cruiser hereinafter referred to as the control vehicle. The capture device 10 preferably includes at least one and preferably a pair of laterally separated hook assemblies 20 each including an arm 22 terminating in an upwardly inwardly oriented hook 24. The arm 22 is pivotally mounted on a frame 26 in turn fixedly attached to the front end 12 of the control vehicle 14.

The frame further includes a housing 28 in which a linear motor 30 and a motor piston 32 is attached to linkage 34 in turn connected to the adjacent hook assembly 20 so as to pivot the hook assembly 20 around a shaft pin 36 from an upright storage position to an outwardly extended position and then to an active position beneath rear portions of the suspect vehicle 15.

In order to stabilize the position of the arm 22 such that the weight of the arm on contact with the ground or portions of the controlled or suspect vehicle 15, a pair of elongated stabilizing members 40 and 42 are positioned in the hook assembly 20. The first stabilizing member 40 shown in the form of a gas piston 44 is attached at one end 46 thereof to the linkage 34 and to a block assembly 48 at the other end 50 thereof. The second stabilizing member 42 is pivotally attached at one end 52 thereof to the housing 28 and to the block assembly 48 at the other end 54.

When activated by the linear motor 30, the hook 24 moves approximately 90 degrees to the open position around pin 36. The linkage 34 between the motor or other actuator 30 and the hook 24 provides such movement as through an electrical, pneumatic or hydraulic connection to the control vehicle depending upon the type of the motor. The gas piston may be of the type utilized in automotive vehicles to keep the hood and/or trunk lid up and in an open position. The gas piston 40 is inherently configured to be in an extended position but can be compressed. On the other hand or just the opposite, the gas piston 44 is inherently configured to be in a compressed position but can be extended.

Both of these gas pistons 40, 44 are held together with block assembly 48. When the capture device 10 is activated, the motor shaft or piston 32 moves upward, e.g., approximately four inches, and pulls on the linkage 34 which causes the hook 24 to pivot to the open position. If there is no obstruction, the linkage 34 functions like a direct link between the motor shaft and the hook 24 without compression or extension of the gas pistons 40, 44. If there is an obstruction, then the linkage 34 is designed to allow both the hook 24 and the motor 30 to be in any random position. Basically with this linkage design if the hook 24 is in the closed position, the operator can manually pull the hook down to the full open position. Alternatively if the hook 24 is in the full open position, the operator can manually push the hook 24 to the closed position. This linkage design creates a constant, consistent and predictable pressure at the tip of the hooks 24. It should be noted that other tension or stabilizing devices such as springs, heavy bungee cords, a torsion bar or clutch may be substituted for the gas pistons 40, 44. It should also be pointed out that the terms "extended" and "compressed" are intended to cover the equivalent operational characteristics of such other stabilizing devices set out above, e.g., twists in opposite directions for torsion bars, etc.

The motor 30 preferably has a built-in clutch in the event something prevents the motor piston 32 from moving the operational distance up or down, e.g., four inches, to ensure such event will not exert too much pressure or damage any component of the capture device 10.

As previously indicated, proximity sensors 60 and 62 may be mounted on the hook assembly 20 so as to both gauge the distance between the rear of the suspect vehicle and the police or other law enforcement vehicle (sensor 60) as well as to gauge the distance between the hook end (sensor 62) and the undercarriage of the suspect vehicle.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In combination with a control vehicle having a front end, a capture device mounted at the front end of said control vehicle for positively engaging portions of an undercarriage of a suspect vehicle positioned in front of and in close proximity to said control vehicle, said capture device comprising means for attachment to the front end of the control vehicle and at least one movable arm having a rear end and a forward end and having an upwardly extending terminal hook portion at said forward end, said arm in turn mounted on said front end and movable from a storage position to an extended first operable position wherein said arm extends outwardly and forwardly from said control vehicle front end and beneath the undercarriage of the suspect vehicle and subsequently to a second operable position elevated from said first operable position wherein said hook portion is capable of entrapping portions of the undercarriage of the suspect vehicle, said arm having inner and outer surfaces with said inner surface oriented towards said control vehicle front end in the storage position and upwardly in said operable positions, and actuation means for moving said arm from said storage position to said first operable position and subsequently to said second operable position, wherein said at least one movable arm located on an assembly attached to a frame attached to the front end of the vehicle, said arm pivotally attached to said frame and said actuation means via linkage, and in addition first and second elongated stabilizing members operationally connected to said linkage and to said assembly, said first stabilizing member biased to an always extended first position and said second stabilizing member always biased to a retracted or compressed first position and both said stabilizing members free to move into a second position opposite to their respective first positions.

2. The capture device of claim 1, wherein said first and second stabilizing members are gas pistons.

3. The method of controlling a suspect vehicle with a control vehicle in turn having a capture device mounted to the front end thereof, said capture device comprising means for attachment to the front end of the control vehicle and at least one movable arm having an inner end and a forward end and having an upwardly extending terminal hook portion at said forward end, said arm in turn mounted on said front end and movable from a storage position to an extended first operable position wherein said arm extends outwardly and forwardly from said control vehicle front end and beneath the undercarriage of the suspect vehicle and subsequently to a second operable position elevated from said first operable position wherein said hook portion is capable of entrapping portions of the undercarriage of the suspect vehicle, said arm, having inner and outer surfaces with said inner surface oriented towards said control vehicle front end in the storage position and upwardly in said operable positions, and actuation means for moving said arm from said storage position to said first operable position and subsequently to said second operable position, wherein said at least one movable arm located on an assembly attached to a frame attached to the front end of the vehicle, said arm pivotally attached to said frame and said actuation means via linkage, and in addition first and second elongated stabilizing members operationally connected to said linkage and to said assembly, said first stabilizing member biased to an always extended first position and said second stabilizing member always biased to a retracted or compressed first position and both said stabilizing members free to move into a second position opposite to their respective first positions, comprising parking the control vehicle with the front end thereof in close proximity to the rear end of the suspect vehicle and then activating said capture device to engage the undercarriage of said suspect vehicle prior to exiting the control vehicle to question occupant(s) of the suspect vehicle.

4. The method of claim 3, wherein said first and second stabilizing members are gas pistons.

\* \* \* \* \*